United States Patent Office 2,849,410
Patented Aug. 26, 1958

2,849,410

ADHESIVE COMPOSITION INCLUDING LIMED ROSIN AND ACRYLIC PLASTICIZER

Raymond R. Lamm, Ambler, Pa., assignor to The Patent and Licensing Corporation, New York, N. Y., a corporation of Massachusetts No Drawing. Application September 24, 1954
Serial No. 458,283

2 Claims. (Cl. 260—27)

This invention relates to a resinous composition, and is more particularly concerned with a resin-containing adhesive composition.

In the installation of wall and ceiling coverings such as acoustical tile, tile board and the like, adhesives are commonly employed for securing the coverings to the supporting surface. The method generally employed in acoustical tile installations, for example, involves applying daubs of the adhesive to the back of each tile, placing the tile against the ceiling or other surface to which it is to be bonded, and directing the tile into place by a sliding movement so as to spread the adhesive and unite the latter with the supporting surface and the back of the tile. Once the tiles have been directed into place their installation is considered to be complete and they are left without external supporting means to hold them in position while the adhesive dries. Adhesives employed for this purpose must, therefore, have high wet strength in order that the tiles will be held securely in place during the drying period while the solvent is evaporating from the adhesive mass.

From the applicator's viewpoint, on the other hand, it is important that the adhesive have a consistency which permits it to be scooped out of the container and daubed on the tile rapidly and with minimum effort. This requires an adhesive having "short-body" characteristics. An adhesive having a "long body" or stringy consistency is difficult to handle and increases the time required for application. In adhesives heretofore known, however, high wet strength and short body consistency have been found to be somewhat antagonistic or competing properties. Attempts made to improve the wet strength of tile adhesives have adversely affected the short body characteristics of the adhesives and improvements in the consistency of the material have been effected generally at the expense of wet strength. Tile adhesives heretofore made, therefore, have been based on a compromise between these two desirable but seemingly antagonistic properties.

It is an object of this invention to provide an improved adhesive composition adapted for use in the installation of wall and ceiling coverings.

It is a further object of the invention to provide an adhesive composition of the character indicated having high wet strength and desirable consistency characteristics.

It is a still further object of the invention to provide an acoustical tile adhesive having optimum short body characteristics in combination with high wet strength.

Other objects and features of the invention will be apparent from the following detailed description:

According to the invention, an adhesive composition is provided which comprises a brittle resinous binder, a volatile solvent, and, as a plasticizer for the resinous binder, a polymerized acrylic ester. I have found that polymerized acrylic esters are excellent plasticizers for the brittle resinous materials used in tile adhesives, whether used alone as the sole plasticizer or in combination with other plasticizers, and further I have found that when so used, the polymerized acrylic esters effect a marked improvement in the wet strength of adhesives containing them without adversely affecting the normal consistency of the adhesive. Further, the polymerized acrylic esters maintain the desirable high wet strength of the adhesive while permitting the adhesive to be otherwise treated to modify its normal consistency so as to provide optimum short body characteristics. Thus, in accordance with the invention, I produce an adhesive having a combination of desirable properties which make it particularly suitable for the installation of acoustical tile, tile board, and like wall and ceiling coverings. In my composition, the polymerized acrylic esters function both as plasticizers for the resinous component and as effective wet strength improvers, even when used in relatively small quantities. Thus, it is not necessary to use other plasticizers, although it is sometimes desirable to use other plasticizing agents in order to obtain variations in the characteristics of the product.

The polymerized acrylic esters which I employ in the adhesive compositions of my invention are the polymers or copolymers of the aliphatic esters of acrylic or methacrylic acid. These polymers are generally made by treating the appropriate monomer or mixture of monomers in the presence of a suitable polymerization catalyst. In preparing my compositions I employ the polymerized acrylic esters per se or in the form of solutions. The acrylic esters which are suitable in my compositions are those which are soluble in hydrocarbon solvents such as petroleum solvents e. g. V. M. and P. naphtha, Stoddard solvent, aromatic solvents, such as toluene, coal-tar naphthas and the like. The acrylic esters are polymerized to produce polymers of various degrees of polymerization and the higher polymers are then "cut-back" with an appropriate solvent to the desired viscosity. For example, a solution of a given desired viscosity may be obtained by preparing a hydrocarbon-soluble polymer of a relatively high degree of polymerization and then cutting it back with the necessary quantity of solvent, or a polymer of the desired viscosity may be prepared directly by controlling the degree of polymerization. I prefer to use a polymerized acrylic ester composition having a viscosity at 100° F. within the range of about 4000 to 6500 centistokes, although compositions having viscosities somewhat below or above this range are suitable. I have found particularly effective a polymerized acrylic ester product of the above-described type marketed under the trade designation Acryloid #710 which is a copolymer lauryl and hexyl methacrylate in a 40% solution of 150 sec. solvent refined lubricating oil. This material is soluble in hydrocarbon solvents and has a viscosity of 5200 centistokes at 100° F., and a specific gravity of 0.89 @ 60° F., pour point of +20° F. and a neutralization value of 0.3. As I have indicated, other plasticizers may be used in addition to the polymerized acrylic ester, such as, for example, pine oil, mineral oil derivatives and the like. The quantities of such additional plasticizers used will depend upon the properties desired in the adhesive product. For best results from the standpoint of high wet strength, I prefer to have the plasticizer mixture comprise at least about 40% of the acrylic polymerized ester, the balance being any convenient plasticizer for the resinous material employed.

The brittle resinous materials employed in my improved adhesive are preferably natural resins or resinous derivatives thereof, such as rosin, dammar, kauri, batu, limed rosin, heat-treated rosin, natural resin esters, e. g. ester gum and the like. I have found limed rosin, heat-treated rosin, or mixtures thereof particularly suitable as components of adhesives made according to my invention.

The solvent component of my adhesive is any relatively volatile organic solvent for the resinous material. Especially suitable are solvents of the hydrocarbon type such as petroleum naphtha, aromatic solvents and the like. I have found particularly effective, for example, a petroleum hydrocarbon fraction having a boiling range of about 300° to 375° F. Mixtures of hydrocarbon solvents and small amounts of other solvents such as alcohol or acetone, are advantageously employed, as for example, when gum rosin, soda-treated rosin, copal, or the like are contained in the resin component.

A filler is advantageously added to the adhesive mixture to impart desirable short-body characteristics. Clay is particularly effective for this purpose, although the other fillers such as asbestos, whiting, diatomaceous earth and slate flours are suitably employed. When clay is used as the filler, a small amount of water may be added for the purpose of increasing the effectiveness of the clay. It is a feature of the invention that substantial quantities of filler may be added to the adhesive composition to give it excellent short-body properties without reducing the desirable high wet strength. Thus in accordance with my invention I am able to provide an adhesive having a combination of properties which permit it to be quickly and easily applied and to serve as an effective and efficient bonding agent.

The proportions of the various components forming the adhesives of the invention may be varied over a substantial range and satisfactory results obtained. For example, the amount of the polymerized acrylic resin component used may be from 5 to 100 parts per 100 parts of the brittle resinous material. Preferably, I use about 25 parts of the polymerized acrylic ester component to 100 parts of the resinous component. The proportion of resinous material will, of course, vary but for best results in an acoustical tile cement, it should represent 25 to 40% of the total composition, preferably about 30%. The filler preferably varies from about 1 part to 2 parts per part of resin, although up to 3 parts may satisfactorily be used depending upon the type of filler. When using clay, for example, not more than about 2 parts are needed to provide desired short-body properties to the product.

The quantity of solvent used depends upon the nature of the resinous component contained in the adhesive and is used in the quantities necessary to bring the adhesive to the desired viscosity at normal temperatures.

In preparing adhesives embodying my invention, the ingredients may be mixed at room temperatures or at higher temperatures, i. e., temperatures above the melting point of the rosin. For example, the resinous material in pulverized form may be incorporated with the solvent and the polymerized acrylic ester or the resinous material may be added in molten form. The final viscosity of the product is adjusted by addition of small quantities of solvent.

The following specific examples of acoustical tile adhesive formulations are further illustrative of the invention. In these examples, proportions of the ingredients are expressed in parts by weight:

*Example I*

| | Parts |
|---|---|
| Limed rosin | 14 |
| Polymerized acrylic ester solution (40% sol. in oil—copolymer of lauryl and hexyl methacrylate) | 3½ |
| Solvent [1] | 6 |
| Clay | 24 |
| Water | 1 |

[1] The solvent employed is a paraffinic petroleum fraction having a boiling range of 300–375° F.

*Example II*

| | Parts |
|---|---|
| Heat-treated rosin | 14 |
| Polymerized acrylic ester solution (40% sol. in oil) | 3½ |
| Solvent (300°–375° F. b. r.) | 6 |
| Clay | 24 |
| Water | 1 |

*Example III*

| | Parts |
|---|---|
| Limed rosin | 10½ |
| Heat-treated rosin | 3½ |
| Polymerized acrylic ester solution (40% sol. in oil) | 3½ |
| Solvent (300°–375° F. b. r.) | 6 |
| Clay | 24 |
| Water | 2 |

*Example IV*

| | Parts |
|---|---|
| Limed rosin | 10½ |
| Heat-treated rosin | 3½ |
| Polymerized acrylic ester solution (40% sol. in oil) | 2 |
| Pine oil | 1½ |
| Solvent (300°–375° F. b. r.) | 6 |
| Clay | 24 |
| Water | 1 |

*Example V*

| | Parts |
|---|---|
| Limed rosin | 10½ |
| Heat-treated rosin | 3½ |
| Polymerized acrylic ester solution (40% sol. in oil) | 2 |
| Hydrocarbon oil extract | 1½ |
| Solvent (300°–375° F. b. r.) | 6 |
| Clay | 24 |
| Water | 1 |

The hydrocarbon oil extract is a non-paraffinic material extracted from lubricating oil stocks by selective solvents such as furfural, phenol and the like and is typical of mineral oil derivatives having a plasticizing action on resins.

The wet strength of each of the above adhesive products was measured by the following test procedure:

The test sample is made by cutting a circular disk (2¾ inches in diameter) from a piece of acoustical tile or ⅜ inch thick gypsum board. A small hole is made in the center of the disk and a string is placed through the hole and tied to a 3 d. finish nail laid across the hole. A hook for attaching the test load is provided at the free end of the string. The base to which the test sample is secured by the adhesive being tested is a ⅜ inch gypsum board. A dab of the adhesive about 2¾ inches in diameter is applied to the under-surface of the base and the circular disk is then pressed against the adhesive in such a way that a vertical space of ½ inch is left between the lower surface of the base and the upper surface of the circular disk. The base is then placed in a horizontal position with the circular disk downwardly in a constant temperature oven maintained at a temperature of 130° F. Within 2 minutes a load of ½ pound is attached to the supporting arm or hook hanging from the circular disk. The test assembly is left in the oven for 24 hours and then inspected. An adhesive which does not fail during the 24 hour period has high wet strength.

None of the products embodying the invention exhibited failure under the conditions of this test.

For purposes of comparison, two adhesives similar to those of Examples IV and V and containing equivalent amounts of plasticizer but containing no polymerized acrylic ester were tested. These adhesives failed to pass the above-described wet-strength test.

This application is a continuation-in-part of my copending application Serial No. 96,155, filed May 28, 1949, and now abandoned.

I claim:

1. A normally viscous and tacky adhesive composition adapted for adhesively securing accoustical tiles and the like to a supporting surface and characterized by high wet strength comprising essentially about fourteen parts by weight of limed rosin binder, about three and one-half parts by weight of a 40 percent solution in oil of a copolymer of lauryl and hexyl methacrylate, about six parts by weight of a volatile hydrocarbon solvent, about 24 parts by weight of clay and about one part by weight of water.

2. A normally viscous and tacky adhesive composition adapted for adhesively securing acoustical tiles and the like to a supporting surface and characterized by a high wet strength comprising essentially from 25% to 45% by weight of limed rosin binder, a plasticizer comprising a 40% solution in oil of lauryl and hexyl methacrylate, clay, water in the range of about 2% to 4% of the adhesive and a volatile hydrocarbon solvent in quantity necessary to bring the adhesive to proper consistency, said adhesive composition containing about 25 parts of said plasticizer to 100 parts of binder and from about 100 to 200 parts of said clay per 100 parts by weight of said binder.

References Cited in the file of this patent

UNITED STATES PATENTS

| | | |
|---|---|---|
| 2,063,078 | Barrett | Dec. 8, 1936 |
| 2,169,558 | Dittmar | Aug. 15, 1939 |
| 2,204,517 | Strain | June 11, 1940 |
| 2,278,141 | Worth | Mar. 31, 1942 |
| 2,454,676 | Skow et al. | Nov. 23, 1948 |
| 2,610,924 | Lamm | Sept. 16, 1952 |

OTHER REFERENCES

Leonard et al., J. Pol. Sci., vol. XI, No. 2 (1953) pp. 539–544.